Patented Dec. 16, 1930

1,784,928

UNITED STATES PATENT OFFICE

MARION DORSET, OF WASHINGTON, DISTRICT OF COLUMBIA

VACCINE FOR HOG CHOLERA AND PROCESS FOR MANUFACTURING THE SAME

No Drawing.   Application filed September 1, 1928.  Serial No. 303,619.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to me of any royalty thereon.

Hog cholera is a highly fatal and contagious disease of hogs. The cause of this disease has not been isolated nor made visible even by the use of the most powerful microscopes. This disease-producing agent is generally spoken of as the "virus" of hog cholera and is known to be present in the tissues, the blood, and the various secretions and excretions of affected pigs. Its presence is proven by the ability of the tested material to bring about an attack of hog cholera in non-immune pigs. One of the properties of hog cholera virus is then, to produce hog cholera in susceptible pigs when the virus is administered in the proper way and in a suitable dose. This hog cholera virus has a second property which is the ability to cause the formation of antitoxin or antibodies in the blood of immune pigs. In other words, a pig which has recovered from hog cholera is immune thereafter for life. If this immune be injected with the virus, blood or tissue extracts from pigs sick of cholera, the immune is not made sick but its blood is so affected that an antitoxin is formed in it. The antitoxin thus developed is capable of protecting hogs against cholera. (See Letters Patent No. 823,110, granted to me.) The second property of hog cholera virus is thus demonstrated and this property may be said to be the ability to cause the production of hog cholera antibodies in the body of the pig.

The present method of protecting hogs against cholera is based upon the patent above-named. It is effective and is widely used in practice. It is believed, however, that the invention which I shall describe herein will be an improvement over the process now in use, particularly because of its relative cheapness.

My invention deals with a vaccine for hog cholera, and the production of this vaccine is based upon my observation that hog cholera virus has two properties as described above: (1) the property of producing hog cholera in non-immune pigs; and (2) the property of causing the formation of antibodies when injected into the organism of immune pigs. I have believed that if the hog cholera virus, as contained in the blood and tissues, could be robbed of its disease-producing power while its immunizing power is left unimpaired, there would be produced a product which could be safely used to protect non-immune pigs against cholera. My invention, therefore, consists simply in so treating the virus of hog cholera in any form or location in which it may exist, as, for example, in the blood, tissues, secretions or excretions of pigs sick of cholera, as to rob it of its disease-producing power and to leave its immunizing power unimpaired. I accomplish this by taking the blood, tissues, secretions and excretions, all or any one, and treating them with a solution of formic aldehyde in such strength and for such time as to rob the material of power to produce hog cholera without seriously impairing its power to bring about immunity. Where tissues are used they must, of course, be reduced to a finely divided state and suspended with a certain amount of fluid so that they may be satisfactorily used by the veterinarian for injection. The tissues are therefore ground to a fine state of subdivision, mixed with a liquid, e. g., water, or a small amount of normal physiological salt solution, and then subjected to treatment with a solution of formaldehyde. The formaldehyde is mixed with the blood, tissues in suspension and solution, secretions or excretions in a proportion preferably not less than 0.1 of 1% of formaldehyde ($CH_2O$) and preferably not greater than 0.3% formaldehyde ($CH_2O$). After mixing the virus (the term "virus" is used herein and in the claims to mean the tissues, blood, secretions or excretions containing the causative agent of hog cholera) and the formaldehyde solution, the mixture is carefully preserved in sterilized bottles and is allowed to stand until the power of the virus to produce disease in pigs has been dissipated. The time required will vary (1) with the proportion of formaldehyde employed; (2) with the particular source of the virus, that is, for example, whether the blood, tissues, excretions of secretions are employed; and (3) with the temperature at which the mixture is stored. Roughly speaking, the higher the temperature of the storage, the more rapidly will the virus undergo the desired change. Temperatures above 40° C. are undesirable because of the tendency of the tissues, blood, etc., to gelatinize. At a temperature of 37.5° C. the necessary change may be brought about in the virus within 48 hours whereas lower temperatures, such as 10° C. to 23° C. will require a much longer time of exposure before being used in practice.

After it has been demonstrated by inoculating some of the vaccine into non-immune pigs that it is incapable of setting up disease it is then ready to be bottled for use. It is employed by injecting it subcutaneously, or intraperitoneally into non-immune pigs. Pigs so treated do not, as a rule, acquire immunity immediately; however, the immunity is usually firmly established within two weeks after administration of the vaccine. Pigs so treated are capable of withstanding injections of hog cholera virus which will kill non-immune pigs that have received no protective treatment. The amount of vaccine required per pig would depend upon several different factors such as the age and weight of pig and the potency of the particular batch of vaccine determined by the test referred to above. A single dose may be given or two or more injections may be administered, as required, at intervals of several days. One or more cc. constitute a dose.

It will be understood from the foregoing that where blood or other parts, of hogs affected with cholera, is used in preparing my vaccine, and the blood or other parts is already in solution, it is not necessary to add water, salt solution, or other liquid, but that in the event that the tissues or other parts of the hogs are used that are not already in solution, it is desirable to add thereto a quantity of water, salt solution or other liquid in order to obtain a solution. It should also be understood that in adding formaldehyde to a solution obtained as above described, the formaldehyde is also in the form of a solution. It should also be understood that the proportions of blood, tissues in suspension and solution, etc., on one hand and the formaldehyde, on the other hand should preferably be approximately within the following range: 997 to 999 parts of the former and 3 to 1 parts of the latter.

I claim:

1. A vaccine for hog cholera comprising hog cholera virus from any source and formaldehyde in amount sufficient to eliminate the disease producing power of the virus without destroying its immunizing power.

2. A vaccine containing hog cholera virus and one to three parts of formaldehyde per thousand parts of vaccine.

3. A process for the manufacture of hog cholera vaccine which consists in mixing together hog cholera virus obtained from the blood, tissues, secretions and excretions of hogs affected with cholera and formaldehyde at a temperature below 41° C. for a time sufficiently long to destroy the disease producing qualities of the virus without destroying its immunizing power.

4. The process for the manufacture of hog cholera vaccine which consists in mixing together hog cholera virus obtained from the blood, tissues, secretions and excretions of hogs affected with cholera, and formaldehyde at a temperature of about 37.5° C., the mixture being maintained at said temperature for approximately 48 hours.

MARION DORSET.